(12) United States Patent
Felderman

(10) Patent No.: US 6,189,933 B1
(45) Date of Patent: Feb. 20, 2001

(54) TECHNIQUE FOR REDUCING A LARGE MAP INTO A COMPACT PAGING FORMAT

(76) Inventor: Lyle Ely Felderman, 681 Woodlake Dr., Brea, CA (US) 92821

( * ) Notice: Under 35 U.S.C. 154(b), the term of this patent shall be extended for 0 days.

(21) Appl. No.: 09/542,812

(22) Filed: Apr. 4, 2000

Related U.S. Application Data

(63) Continuation of application No. 09/335,965, filed on Jun. 6, 1999, now abandoned.

(51) Int. Cl.[7] .................................................. G09B 29/00
(52) U.S. Cl. ............................................ 283/34; 434/150
(58) Field of Search ................................. 283/34, 35, 61, 283/62; 281/2, 5; 40/904; 434/150; 428/121

(56) References Cited

U.S. PATENT DOCUMENTS

| | | | |
|---|---|---|---|
| 4,289,333 | * | 9/1981 | Gaetano ............................. 283/34 X |
| 4,906,024 | * | 3/1990 | Leiu .................................... 283/34 X |
| 5,868,429 | * | 2/1999 | Raymond et al. ..................... 283/34 |
| 6,056,321 | * | 5/2000 | Donley ............................... 283/34 X |

* cited by examiner

Primary Examiner—Willmon Fridie, Jr.

(57) ABSTRACT

A large rectangular map, or chart, that is reduced to small and uniformly-sized display areas, in a top half section and bottom half section, having leaves in each section for easy directional leafing (right to left, left to right, up tab, down tab) to all selected display areas. There is no folding or unfolding. This leafing format is made possible by simply making three folds horizontally (inward, outward, inward), cutting a slit along the horizontal centerline between the right and left edge panels, fanfolding lengthwise into an odd number of vertical creases that form a vertical strip of the eight right edge panels, making a single horizontal fold of this strip into a tab, and abutting the four corner panels to create the base map paging format of four panel display pages. A foldable cover is required to anchor the format for permanency, stability, and storage. The size of the display pages and the folded cover can be controlled by the number of vertical folds lengthwise; more odd number of folds produce a smaller map; less folds a larger map. Current maps are generally machine folded for storage; fanfolded lengthwise and two-folded vertically. They require unfolding and refolding. Many have covers only for presentability. This invention contains convenient features for use in small areas as: no unfolding and refolding, ease in opening for use, ease in closing for storage, ease in paging to all map areas, and mobility for changing viewing angles.

2 Claims, 2 Drawing Sheets

TECHNIQUE FOR REDUCING A LARGE MAP INTO A COMPACT PAGING FORMAT

This application is a continuation of application Ser. No. 09/335,965 filed Jun. 6, 1999, now abandoned.

CROSS REFERENCES TO RELATED APPLICATIONS

U.S. Pat. No. 5,207,457—May 4, 1993—R. J. Haynes
U.S. Pat. No. 3,143,363—Aug. 4, 1964—G. Falk
U.S. Pat. No. 4,270,773—Jun. 2, 1981—R. Gaetano
U.S. Pat. No. 4,906,024—Mar. 6, 1990—U. Lein
U.S. Pat. No. 2,179,172—Nov. 7, 1939—C. Bonnaire
U.S. Pat. No. 680,350—Aug. 13, 1901—S. Parmelee
U.S. Pat. No. 5,868,429—Feb. 9, 1999—D. Raymond
U.S. Pat. No. 1,159,459—Nov. 9, 1915—W. Wood
53062—Apr. 26, 1937—P. Arentzen (Denmark Patent)

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

Most maps (highway, aviation, etc.) and other charts are too large for ready reference in a small area, as in a car or airplane. In general, they come fanfolded vertically onto their left or right edge and then folded twice from top to bottom into a storage format. As a quicker, immediately ready, and safer alternative for use, this invention folds a map in a uniquely simple manner into a small, more convenient, uniform, and flat display area with leaves to more quickly leaf to all map display areas. A cover must be adhered to provide a permanent stabile format and for closing to a compact storage format.

2. Review of the Prior Art

None of the listed cross-referenced patents match the descriptions of this titled application for the unique continuous folding of a map into a base uniform four-panel display and paging configuration necessary for economical assembly. Also, none specify a single slit for folding the map into two sections, the requirement for a cover to permanently fix the paging configuration, or drawings that show any likeness or similarity to the complete folding procedure of this patent application. These inventions contain complex descriptions as to folding, making multiple slits, and attaching covers to get a display area configuration for paging. Some of the patents contain systematic viewing procedures, non-uniformly sized viewing areas, provisions for unfolding and refolding, and lamination, none of which are included as claims for this titled specification. This titled invention is alone in claiming to fold a map in one continuous simple folding procedure to its display and paging configuration, and a cover to permanently fix the configuration.

BRIEF SUMMARY OF THE INVENTION

The basic principle on which the paging format functions is that a selected number of inward and outward folds are made in the map both horizontally and vertically to produce creases for a selected number of rectangular panels. The map's display face is then fanfolded to the left with the right edge panels remaining open, resulting in a vertical strip of the eight right-most panels. This folding also adjoins the right edge panels with the left edge panels. This strip is folded once horizontally to adjoin the four corner panels which results in the base of the paging format and the initial display page. The inside panels become leaves with their central veins centered at the fold line between the two right side panels and two left side panels. A slit along the horizontal centerfold between the left and right edge panels enables the folds to create a top half section of the map that overlies a bottom half section, each with independent leaves for paging, and a horizontal tab for accessing either section. The bottom section is accessed by raising the horizontal tab upward. The map now has its initial four-panel viewing format consisting of the top section's right-most four panels. A necessary wrap-around cover is adhered to the back side to permanently fix the display configuration. The inward panels, as pages, may now be leafed left and right to give a continuous view of the map's top section, tabbed to the bottom section, and similarly leafed to view.

DETAILED DESCRIPTION OF THE INVENTION

To understand how the paging format process is achieved five processes are performed: Dimensioning, Horizontal Dimension Folds, Vertical Dimension Folds, Page Folding, and Cover Application.

1. Dimensioning

Figure 1:
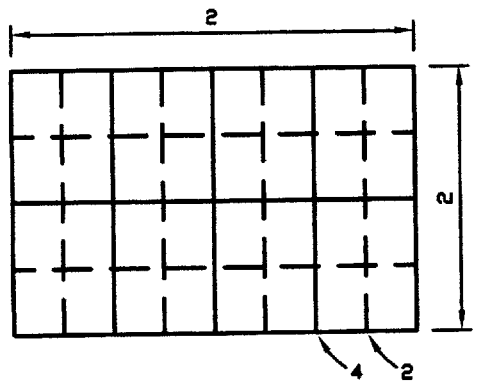
FIG. 1 is a plan view of a map showing its initial placement for planning its folds and the required number of inward and outward folds for completion of the folding process.
Figure 11:
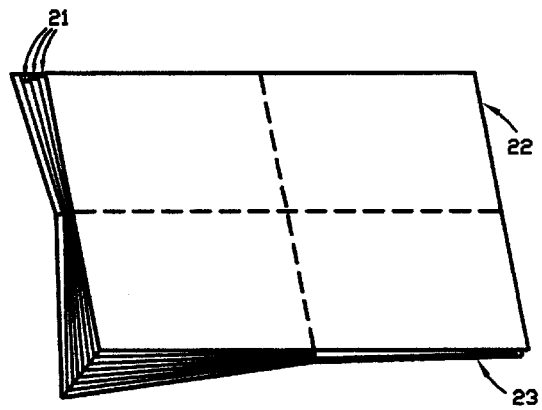
FIG. 11 is a perspective, similar to FIG. 8, with the addition of a cover that shows the open cover display area that is ready for paging.

Place the map with its display face in view and with its longest dimension in a horizontal position. For orientation during folding, this provides an upper edge, bottom edge, left edge, and right edge. If the top of the chart's display is on the upper edge the final cover configuration opens like a check book, pages leaf left and right as in a book, and the horizontal tab is on the bottom edge. If the map's display top and the upper edge are not the same, place the map's display top on the right edge rather than the left edge in order to have the final configuration open as a book, leaf up and down as in a check book, and have a vertical tab along the right edge. First, divide the vertical dimension (Ref. 1, FIG. 1), between the upper and bottom edges, into four equally-spaced panels. Divide the horizontal dimension (Ref. 2, FIG. 11), between the side edges, into an even number of equally-spaced panels, with a minimum of four. The map will be folded in both directions one time less than the number of panels selected, e.g., 9 folds for 10 panels. In all Figures the dashed lines (Ref. 3, FIG. 1) indicate inward folds and the solid lines (Ref. 4, FIG. 1) outward folds. These lines are for dimensioning and folding reference only and not part of the map's folding or final display configurations. When the following folding procedures are complete, the two rightmost upper edge panels of FIG. 1 are the exact dimensions of the folded cover, $\frac{1}{16}^{th}$ of the entire map's area. Thus, adding more horizontally dimensioned panels further reduces the horizontal dimension of the folded map's cover.

3. Horizontal Dimension Folds

Figure 2:
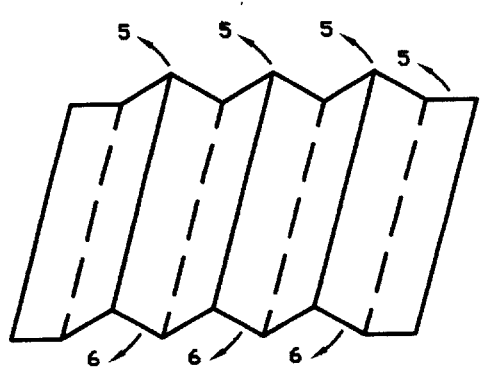
FIG. 2 is a perspective of the horizontal dimension of the map showing the folding necessary for creating the creases for its leaves.

With its display face in view, make an odd number of equally-spaced folds along the the horizontal dimension of the map in a fanfold manner to obtain vertical creases, first inward (Ref. 5, FIG. 2) then outward (Ref. 6, FIG. 2) for the selected number of folds in accordance with FIG. 1. The folded panels between the left and right edge panels will become the leaves of the paging format and there will be an even number of panels.

4. Vertical Dimension Folds

Figure 3:
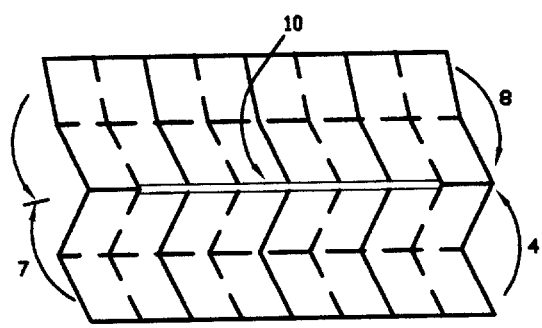
FIG. 3 is a perspective of the map's vertical dimension showing the required three folds and slit that will divide the map into two half sections and enable independent leafing in each section.

With its display face in view, fold the upper and lower edges outwardly (away) until they meet for a horizontal centerfold outward crease (Ref. 7, FIG. 3). Then fold inward the upper edge and lower edge until they meet the centerfold for a horizontal inward crease between the centerfold and upper edge (Ref. 8, FIG. 3) and midway between the centerfold and lower edge (Ref. 9, FIG. 3). This folding results in all of the creases for the planned number of panels per FIG. 1. Next, cut a slit along the horizontal centerfold crease from the inside edge of the left edge panels to the inside of the right side panels (Ref. 10, FIG. 3). This will allow the horizontal leaves above and below the slit to be turned independently after the Page Folding process.

5. Page Folding

Figure 4:
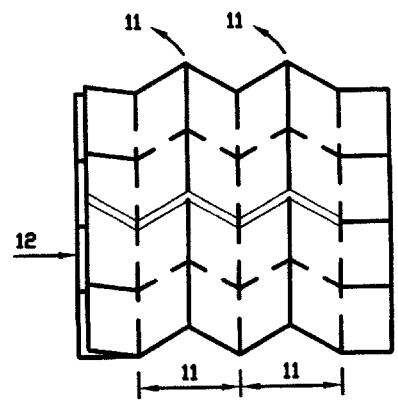
FIG. 4 is a perspective showing the fanfolding that creates the leaves and how they overlay upon the left edge panels.
Figure 5:
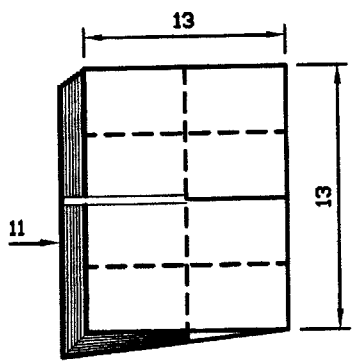
FIG. 5 is a plan view showing the leaves overlayed upon the left edge panels with the right edge panels remaining open.
Figure 6:
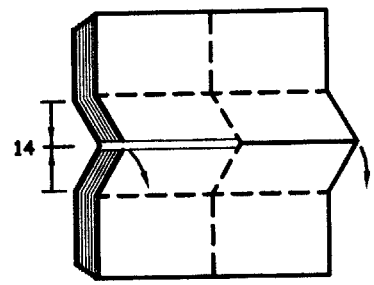
FIG. 6 is a perspective showing how the horizontal leaf, or tab, is formed from the plan view position of FIG. 5.
Figure 7:
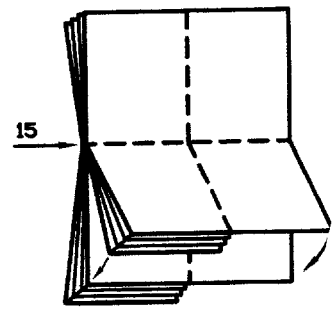
FIG. 7 is a perspective showing how the top and bottom panels become adjacent after forming the horizontal tab.
Figure 8:
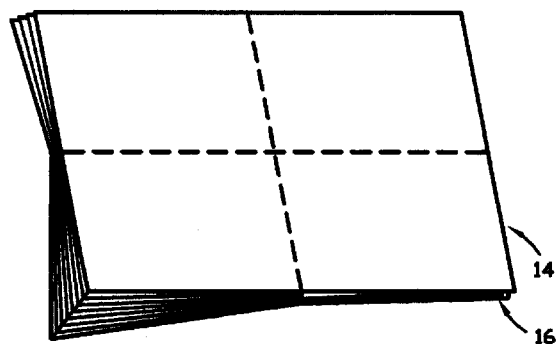
FIG. 8 is a perspective showing the horizontal tab overlayed upon the bottom panels to become the four-panel base of the map's paging format.

The above folds are used to configure the map paging format into a top and bottom section, each containing the number of planned horizontal leaves in the Dimensioning process. To accomplish, fanfold to the left the horizontal folds (vertical creases) (Ref. 11, FIG. 4) and overlay the folded panels upon the left edge panels (Ref. 12, FIG. 4), leaving the right edge panels open (unfolded). The right and left edge panels are now adjacent and in view is a vertical strip of the eight right edge panels (Ref. 13, FIG. 5). Fold together the two center panels of this vertical strip into a horizontal tab, or leaf (Ref. 14, FIG. 6) which also makes the top edge panels adjacent to the bottom edge panels (Ref. 15, FIG. 7). Move the tab (Ref. 14, FIG. 8) down upon the lower edge panels (Ref. 16, FIG. 8) to display the initial viewing page of the map's top section, the map's four upper right corner panels. This configuration forms the base of the map's paging format (FIG. 8). A cover is applied with adhesive to fix this paging format permanently into this position for use as outlined below.

6. Cover Application

Figure 9:
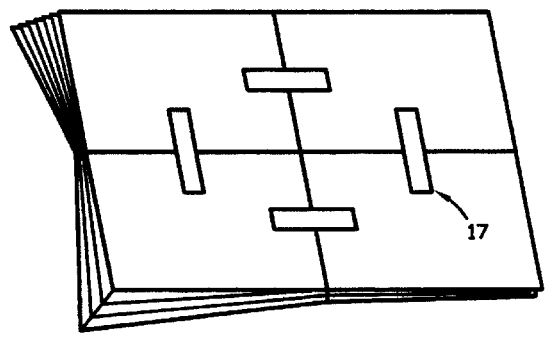
FIG. 9 is a perspective of the non-display back side of the FIG. 8 display format after it was turned 180 degrees and which shows placement of tape to anchor the folds.
Figure 10:
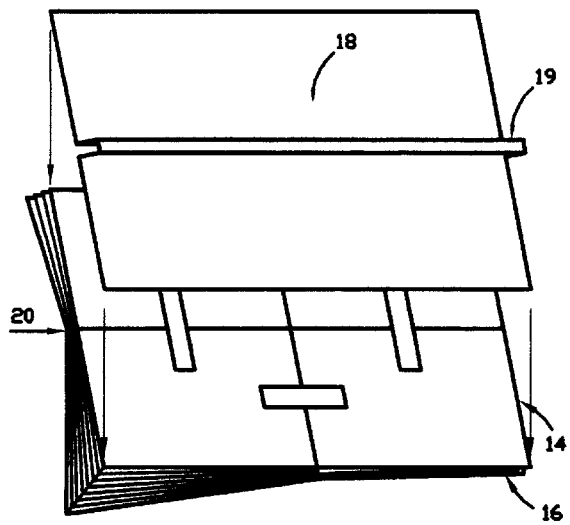
FIG. 10 is a perspective showing the position for applying a wrap-around cover with adhesive.

Rotate the assembly 180 degrees upward to the non-display back side of the map (FIG. 9). Shown is the non-display side of the folded map which contains the outward folds that determine the central veins for the pages on the display side. An adhered cover will permanently fix the paging format on the display side. Align the fold lines and anchor them in position with a small piece of tape across the folds (Ref. 17, FIG. 9). Dimension a wrap-around cover (Ref. 18, FIG. 10) including an expansion seam (Ref. 19) for the cover fold line to allow for expansion at the fold during map opening and paging. Apply adhesive to the back side of the map with none directly on the fold lines. Place the cover onto the map so that the cover's horizontal expansion seam (Ref. 19) matches the assembly's cover fold line (Ref. 20, FIG. 10). An option to the wrap-around cover is to use two pieces of card stock for the cover, allowing separation of the covers along the cover fold line for expansion at the fold during map opening and leaf turning. Rotate the assembly upward 180 degrees to the display side. If the map was folded with its upper edge and map display top coinciding, in view is the right 4-panel display area of the top section, it opens like a check-book, and leafs left to right. Simply turn the leaves (Ref. 21, FIG. 11) left to right to view any four-panel display area in the top section that is contiguous to the features of the previous page. Raise the tab (Ref. 22, FIG. 11) from the lower edge to the upper edge to view the bottom section's display area (Ref. 23, FIG. 11) (South section for a map). Turn the leaves to view this section. Align the corresponding pages of the top (North) and bottom (South) sections to view features that are contiguous along their boundaries. If the map was folded with its display top on the right edge, rotate it $\frac{1}{4}^{th}$ turn counter-clockwise and it will open like a book, leaf up and down, and tab right to left from section to section. There are openings between panels on the side borders of each map section and at the ends of each leaf which can be joined with tape or adhesive to provide further rigidity and a more finished appearance. It is a desirable option but not necessary for the format to function. This function is more easily achieved when the map is in the FIG. 5 configuration.

SEQUENCE LISTING

Not Applicable

I claim:

1. A map or chart with an upper edge, lower edge, left edge, right edge, a front surface display area of four panels of contiguous topographical or diagrammatic features, multiple leaves rooted between the vertical edge panels for accessing all other display locations, a cover to make permanent and stabile the leafing format and for folding for storage, said map comprising:

A. three horizontal evenly spaced folds that form four panels, the first from the top an inward fold, the second an outward fold at the centerline, and the third an inward fold, and an odd-number of vertical folds of three or more, alternately folded inwardly and outwardly to form double leaves between the single-leafed left and right edge panels, the resultant folds causing an even number of multiple panels, and B. a slit along the horizontal centerline's outer fold line between the inner edges of the left and right edge panels which slit enables the map to be divided into a top and bottom section with leaves that can turn independently of each other, and C. from the map's unfolded open position, fanfolded the vertical outer folds into leaves, overlayed them onto the left edge panels with the right edge panels remaining open, abutted the left and right edge panels, resulting in a two-panel wide strip of the right side panels, and D. an outward final fold at the horizontal centerline fold to form a horizontal leaf, to adjoin the inner edges of the four corner panels, to overlay the leaf upon the bottom panels, to position all leaves between the side panels along the vertical centerline, resulting in the base configuration for the map paging format and a display page of the top section's right-most four panels.

2. The map of claim 1, where adhesive tape is applied across the fold lines on the back side of the display configuration to temporarily anchor their alignment; and adhering a wrap-around cover parallel to the back side's horizontal center fold line to provide a permanent and stabile paging format, and a foldable cover for storage.

* * * * *